United States Patent
Smook

(10) Patent No.: US 12,221,953 B2
(45) Date of Patent: Feb. 11, 2025

(54) DRIVE ARRANGEMENT WITH VIBRATION DECOUPLING

(71) Applicants: ZF FRIEDRICHSHAFEN AG, Friedrichshafen (DE); ZF WIND POWER ANTWERPEN N.V., Lommel (BE)

(72) Inventor: Warren Smook, Huldenberg (BE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 18/549,379

(22) PCT Filed: Nov. 7, 2022

(86) PCT No.: PCT/EP2022/080954
§ 371 (c)(1),
(2) Date: Sep. 7, 2023

(87) PCT Pub. No.: WO2023/104410
PCT Pub. Date: Jun. 15, 2023

(65) Prior Publication Data
US 2024/0151210 A1 May 9, 2024

(30) Foreign Application Priority Data
Dec. 7, 2021 (DE) .................... 10 2021 213 859.4

(51) Int. Cl.
*F03D 15/00* (2016.01)

(52) U.S. Cl.
CPC ........ *F03D 15/00* (2016.05); *F05B 2220/706* (2013.01); *F05B 2260/4031* (2013.01); *F05B 2260/964* (2013.01)

(58) Field of Classification Search
CPC ........ F03D 15/00; F03D 15/10; F03D 15/101; F05B 2220/706; F05B 2260/4031; F05B 2260/40311
See application file for complete search history.

(56) References Cited

U.S. PATENT DOCUMENTS 7,238,009 B2 * 7/2007 Schellstede ............. F03D 13/25
415/4.1
2012/0294720 A1 11/2012 Smook et al.
(Continued)

FOREIGN PATENT DOCUMENTS

DE 102011105412 A1 12/2011
DE 102011011164 A1 8/2012
(Continued)

*Primary Examiner* — David E Sosnowski
*Assistant Examiner* — Jason G Davis
(74) *Attorney, Agent, or Firm* — LEYDIG, VOIT & MAYER, LTD.

(57) ABSTRACT

A drive arrangement for a wind turbine includes a sun shaft, which is non-rotatably connected or connectable to a sun gear arranged on a rotor side with respect to the sun shaft, and a shaft or hub for receiving a rotor of a generator. The drive arrangement includes a connecting element, which is connected non-rotatably to the sun shaft and the shaft or hub and which is arranged inside the shaft or hub or on a generator side relative to the shaft or hub, and one or more spring and/or damping elements that decouple the connecting element from the sun shaft and/or the shaft or hub.

9 Claims, 2 Drawing Sheets

(56) References Cited

U.S. PATENT DOCUMENTS

2014/0125064 A1    5/2014  Hofmann et al.
2017/0074249 A1*   3/2017  Smook .................... H02K 1/30
2020/0347880 A1*  11/2020  Krauss ................... F03D 80/70

FOREIGN PATENT DOCUMENTS

| DE | 202012013022 U1 | 7/2014 | |
| DE | 102014201465 A1 | 7/2015 | |
| EP | 3650689 A1 | 5/2020 | |
| WO | WO-2020125884 A1 * | 6/2020 | ............. F03D 15/00 |

* cited by examiner

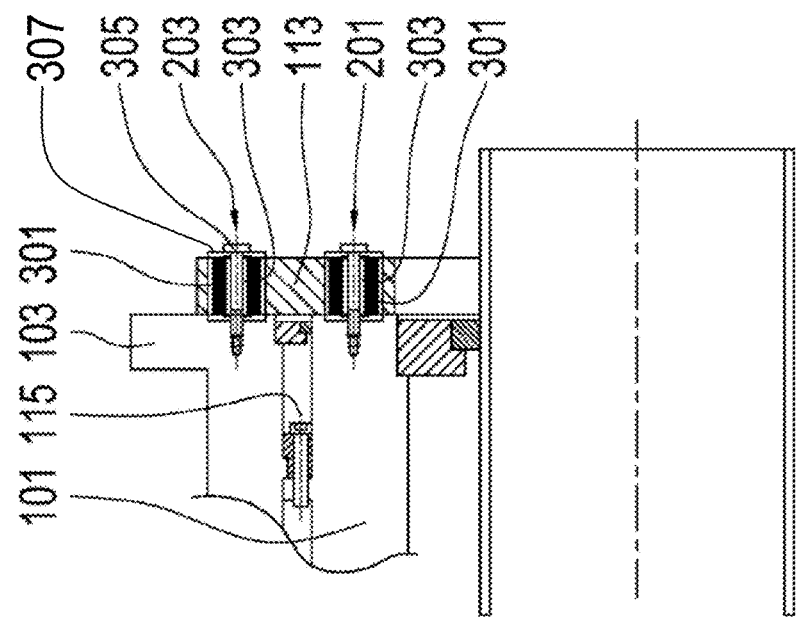
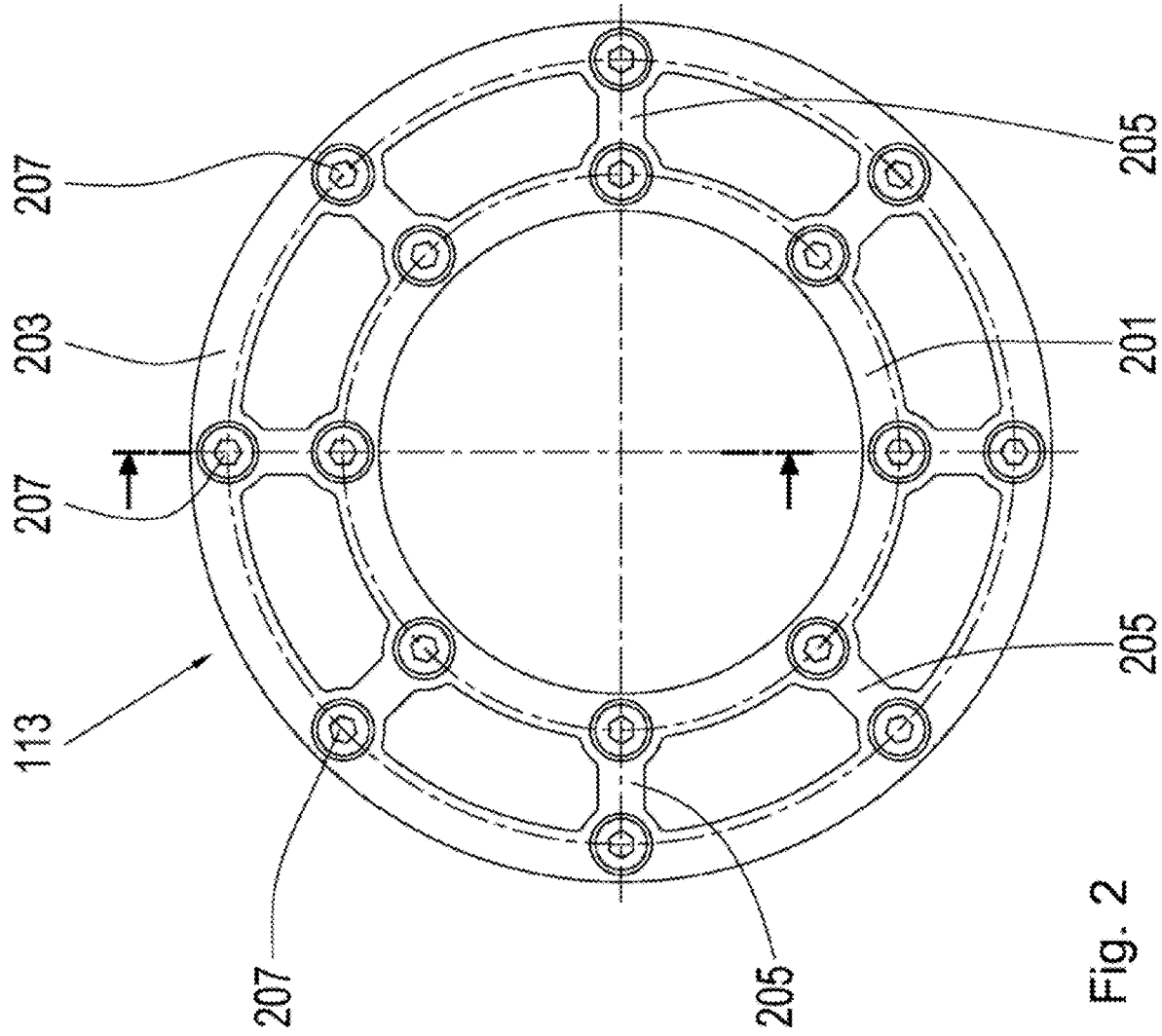
Fig. 2
Fig. 3

DRIVE ARRANGEMENT WITH VIBRATION DECOUPLING

CROSS REFERENCE TO RELATED APPLICATIONS

This application is a U.S. National Phase application under 35 U.S.C. § 371 of International Application No. PCT/EP2022/080954, filed on Nov. 7, 2022, and claims benefit to German Patent Application No. DE 10 2021 213 859.4, filed on Dec. 7, 2021. The International Application was published in German on Jun. 15, 2023 as WO 2023/104410 A1 under PCT Article 21(2).

FIELD

The invention relates to a drive arrangement.

BACKGROUND

EP 3 650 689 A1 discloses a drive arrangement for a wind turbine comprising a generator, a gearbox and a module. The module has a shaft or hub, a bearing arrangement and a support structure. The shaft or hub is rotatably supported in the support structure by means of the bearing arrangement and is non-rotatably connected to a shaft of the gearbox. The shaft or hub bears a rotor of the generator.

The rotor of a wind turbine is often subjected to strong vibrations due to turbulent air flows. These vibrations are introduced into the drivetrain and there they can cause damage or can lead to accelerated material fatigue. Furthermore, disturbing noise emissions can occur.

SUMMARY

In an embodiment, the present disclosure provides a drive arrangement for a wind turbine, comprising a sun shaft, which is non-rotatably connected or connectable to a sun gear arranged on a rotor side with respect to the sun shaft, and a shaft or hub for receiving a rotor of a generator. The drive arrangement comprises a connecting element, which is connected non-rotatably to the sun shaft and the shaft or hub and which is arranged inside the shaft or hub or on a generator side relative to the shaft or hub, and one or more spring and/or damping elements that decouple the connecting element from the sun shaft and/or the shaft or hub.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 illustrates a connecting element;
and
FIG. 3 illustrates the connecting element in an assembled condition.

DETAILED DESCRIPTION

Figure 1:
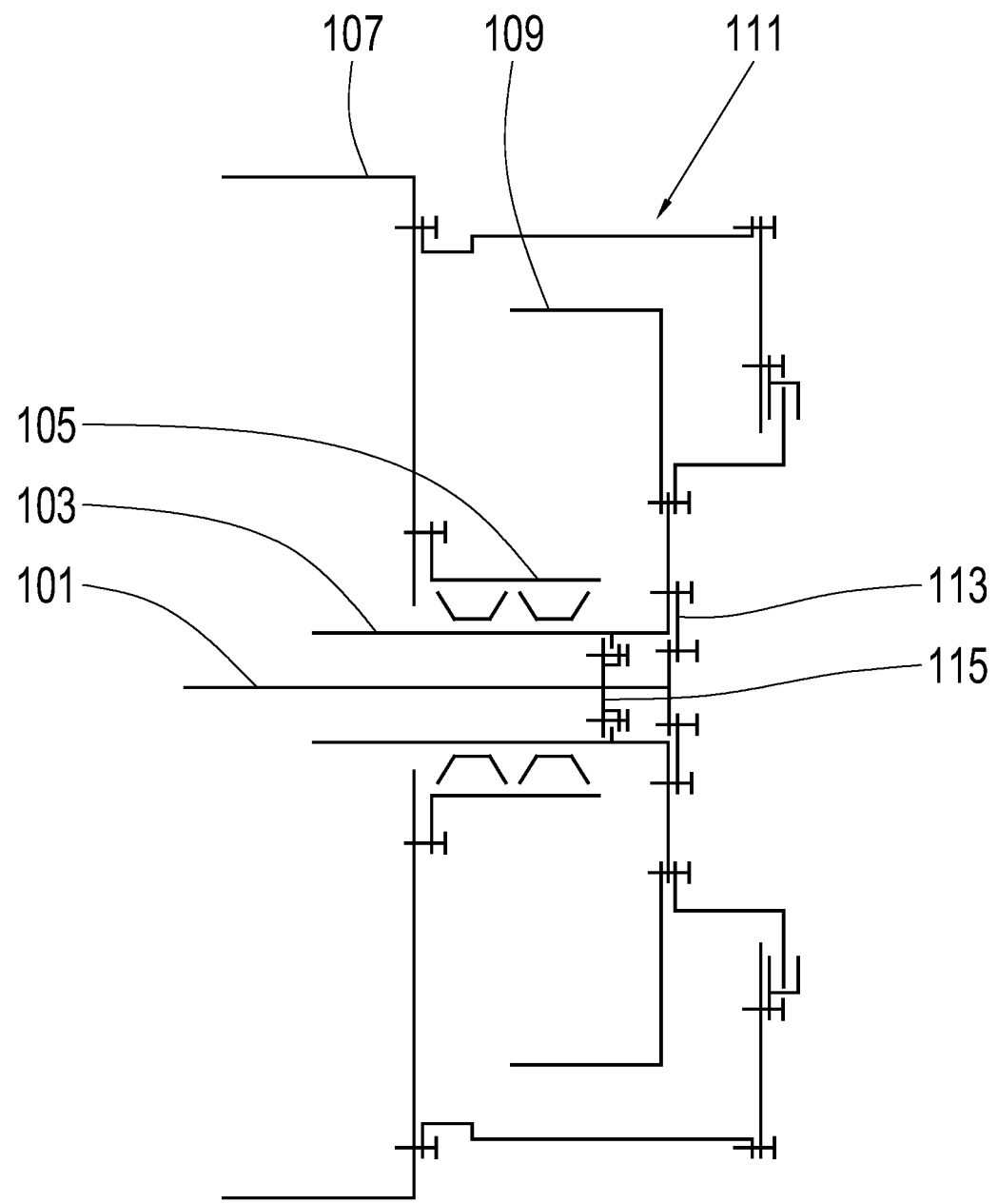
FIG. 1 illustrates a drive arrangement.

In an embodiment, a drivetrain of a wind turbine is provided that is improved compared to the prior art.

The drive arrangement according to an embodiment of the invention is intended for use in a wind turbine, in particular for use in the drivetrain of a wind turbine. The drive arrangement comprises a sun shaft, a shaft or hub and a connecting element.

The sun shaft is non-rotatably connected or connectable to a sun gear. A sun gear is an externally toothed gear that is part of a planetary stage. The planetary stage further comprises a planet carrier, one or more planet gears, and a ring gear. The planetary gears are rotatably supported in the planet carrier and mesh with the sun gear and/or the ring gear, respectively.

Relative to the sun shaft, in this case the sun gear is arranged on the rotor side. A rotor-side arrangement refers to an arrangement in the direction of the wind-driven rotor of the wind turbine. Thus, starting from the sun shaft, the sun gear is arranged in the direction of the rotor. Conversely, the sun shaft extends from the sun gear in the direction of the generator.

The shaft or hub is rotatably mounted or mountable in a housing or a structure fixed to the housing. It is configured to receive the rotor of the generator so that the rotor is non-rotatably connected to the shaft. Preferably, the shaft or hub is configured to bear the rotor. This means that a weight force of the rotor is supported exclusively via the shaft or hub. In this case, the rotor has no bearing of its own, but is supported via the bearing of the shaft or hub.

In order to be able to accommodate the rotor, the shaft or hub has one or more fixing elements, which are joinable with corresponding fixing elements of the rotor, for example by screwing. Alternatively, the rotor is integrally connected to the shaft or hub.

The connecting element is non-rotatably connected to the sun shaft as well as non-rotatably connected to the shaft or hub. Thus, the connecting element establishes a non-rotatable connection between the sun shaft and the shaft or hub.

The connecting element is arranged inside the shaft or hub or relative to the shaft or hub on the generator side. If the connecting element is arranged inside the shaft or hub, part of the shaft or hub extends from the connecting element on the rotor side, while another part of the shaft or hub extends from the connecting element on the generator side. If the connecting element is arranged on the generator side relative to the shaft or hub, the shaft or hub extends from the connecting element on the rotor side, i.e. in the direction of the wind-driven rotor of the wind turbine.

Due to the non-rotatable connection of the connecting element to the sun shaft and the shaft or hub and due to the arrangement of the connecting element within the shaft or hub or with respect to the shaft or hub on the generator side, the shaft or hub is hollow in its interior, and at least part of the sun shaft passes through a corresponding hollow space enclosed by the shaft or hub. The shaft or hub is therefore a hollow shaft or a hollow hub.

According to an embodiment of the invention, the drive arrangement comprises one or more spring and/or damping elements. These are elements that are structurally configured as springs and/or dampers. Spring and/or damping elements are characterized in that their spring and/or damping effect is increased by design measures compared to other elements, which are not configured as spring and/or damping elements and which are also involved in the power transmission. In the present case, the spring and/or damping effect of the spring and/or damping elements is increased in particular relative to the connecting element. Preferably, the spring and/or damping effect of the spring and/or damping elements is also increased relative to the sun shaft and/or the shaft or hub. Possible design measures include, for example, the selection of a special shape and/or a special material.

The spring and/or damping elements decouple the connecting element from the sun shaft and/or from the shaft or hub. This means that the spring and/or damping elements allow relative movements between the connecting element and the sun shaft and/or between the connecting element and the shaft or hub to a limited extent. The relative movements are thereby limited by spring and/or damping forces, which are applied by the spring and/or damping elements and act between the connecting element and the sun shaft and/or between the connecting element and the shaft or hub.

Vibrations can be reduced or avoided by the spring and/or damping elements according to embodiments of the invention.

Preferably, the spring and/or damping elements rotationally decouple the connecting element from the sun shaft and/or the shaft or hub. In that case, the connecting elements allow limited rotations of the connecting element relative to the sun shaft and/or the shaft or hub. The spring and/or damping forces applied by the spring and/or damping elements counteract these rotations, thereby limiting them. As a result, torsional vibrations can be reduced or avoided.

The spring and/or damping elements can decouple the connecting element from both the sun shaft and also the shaft or hub. This is advantageous with regard to a particularly effective reduction or avoidance of vibrations. In a preferred embodiment, however, the sun shaft and the connecting element are rigidly connected to each other, i.e. without the possibility of relative movements. According to an embodiment, the spring and/or damping elements only decouple the connecting element from the shaft or hub. This makes it possible to achieve a particularly durable and at the same time vibration-reduced connection of the sun shaft to the shaft or hub, since the spring and/or damping elements between the connecting element and the shaft or hub are subjected to lower loads. Higher loads act between the sun shaft and the connecting element. The rigid connection of the sun shaft to the connecting element according to this further embodiment thus allows for higher torques to be transmitted.

The connecting element is preferably further configured with receptacles for the spring and/or damping elements. According to an embodiment, the spring and/or damping elements are each inserted into such a receptacle. Preferably, the spring and/or damping elements are each fixed in the respective receptacle in a force-fitting and form-fitting manner.

In a preferred embodiment, the spring and/or damping elements each have an outer cylindrical bushing. With this bushing, the respective spring and/or damping element is inserted into the respective receptacle of the connecting element. Accordingly, the respective receptacle is also preferably cylindrical. There is preferably a force-fitting and form-fitting connection between the outer cylindrical bushing and the respective receptacle.

In a preferred embodiment, the spring and/or damping elements are each screwed to the sun shaft or shaft or hub. In particular, the spring and/or damping elements each have at least one screw hole. This accommodates a screw, which is screwed into a thread of the sun shaft or the shaft or hub.

Preferably, the spring and/or damping elements are each further configured with an inner cylindrical bushing. The bushing is screwed to the sun shaft or shaft or hub. This means that the bushing forms the above-mentioned screw hole. Particularly suitable for this purpose are hollow-cylindrical bushings, the cavity of which forms the screw hole.

In the case of spring and/or damping elements, which are further configured with both an outer cylindrical bushing and an inner cylindrical bushing, the result is an interleaved arrangement of the two bushings. Thus, the inner bushing is arranged in the outer bushing or in a cavity enclosed by the outer bushing.

The spring and/or damping elements are preferably each further configured with an elastomer. Elastomers are dimensionally stable, but elastically deformable plastics, the glass transition point of which is below the operating temperature. The use of elastomers in accordance with the further embodiment represents a design measure for increasing the spring and/or damping effect. Preferably, the elastomer is arranged in an intermediate space between the outer bushing and the inner bushing. In particular, the elastomer can completely fill this intermediate space.

Preferably, the spring and/or damping elements are each further configured with at least one washer having a through hole. The through hole forms, for instance together with the above-mentioned cavity of the second bushing, at least a part of the above-mentioned screw hole. With a screw inserted into the screw hole, the washer as well as the remaining part of the respective spring and/or damping element is fixed in the sun shaft or the shaft or hub.

According to an embodiment, the washer protrudes at least partially beyond the receptacle of the connecting element. This ensures that the connection established via the connecting element between the sun shaft and the shaft or hub is maintained even in the event of a defect in the spring and/or damping element, such as a crack in the elastomer.

The connecting element is preferably further configured with an inner flange, an outer flange, and a plurality of spokes. The inner flange is connected to the sun shaft. Accordingly, the outer flange is connected to the shaft or hub. The connections of the two flanges with the respective shaft or hub and/or the sun shaft may be rigid or, by using the spring and/or damping elements described above, may be resilient and/or damping.

The spokes connect the inner flange and the outer flange to each another. The spokes thus run between the inner flange and the outer flange and end with their respective ends in the inner flange and the outer flange. Preferably, the inner flange, the outer flange and the spokes are integrally connected to each other.

By design, the spokes are flexible relative to each other with respect to a rotation of the first flange and the second flange. This is therefore a design measure for increasing the spring and/or damping effect. Accordingly, the spokes represent spring and/or damping elements.

Preferred exemplary embodiments of the invention are shown in the figures. Corresponding reference numerals indicate identical or functionally identical features.

According to FIG. 1, a sun shaft 101 is configured as a transmission output shaft. On the rotor side, the sun shaft 101 supports itself via a sun gear of a planetary stage in the planet gears of this planetary stage. On the generator side, the sun shaft 101 is supported in a hub 103.

The hub 103 is mounted in a housing extension 105, which is screwed to a gear housing 107. A rotor 109 of a generator 111 is mounted on the hub 103. The rotor 109 is screwed to the hub 103 and is supported entirely by the hub 103.

The rotor 109 is driven via the sun shaft 101. A corresponding drive torque is transmitted via a connecting element 113 that is screwed to the sun shaft 101 and the hub 103.

To prevent axial forces from acting on the connecting element 113, a support element 115 is provided. Via the support element 115, the sun shaft 101 is supported in the axial direction on the hub 103.

The connecting element 113 is shown in FIG. 2. It has an inner screw flange 201 and an outer screw flange 203. Axial spokes 205 extend between the two screw flanges 201, 203. These are elastic relative to torsional vibrations of the inner screw flange 201 and the outer screw flange 203, thus causing a decoupling of the vibrations of the screw flanges 201, 203.

A further vibration decoupling of the screw flanges 201, 203 is achieved by elastomers 207. As shown in detail in FIG. 3, the elastomers 207 each fill an intermediate space between a cylindrical outer bushing 301 and a cylindrical inner bushing 303.

The outer bushing 301 is fixed by means of a press fit in a corresponding hole of the connecting element 113. A screw 305 runs through the inner bushing 303. The screw 305 also runs through a washer 307 that protrudes at least partially beyond the connecting element 113.

By means of corresponding screws 305, the inner screw flange 201 is screwed to the sun shaft 101. The outer screw flange is screwed to the hub 103 by means of corresponding screws 305.

Via the screws 305 the inner bushings 303 are pressed each against the sun shaft 101 and/or the hub 103, respectively. This creates a rigid connection between the inner bushings 301 and the sun shaft or hub 103.

Similarly, the outer bushings 301 are rigidly connected to the connecting element 113. However, the elastomers 207 are flexible. Within this flexibility, the outer bushings 301 and the inner bushings 303 are movable relative to each other. As a result, the sun shaft 101 and the connecting element as well as the connecting element 113 and the hub 103 are also movable relative to each other. Corresponding relative movements result in a deformation of the elastomers 207. The elastomers 207 thereby apply spring forces to counteract the relative movements.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 101 sun shaft
103 hub
105 housing extension
107 gearbox housing
109 rotor
111 generator
113 connecting element
115 support element
201 inner screw flange
203 outer screw flange
205 spoke
207 elastomer
301 outer bushing
303 inner bushing
305 screw

The invention claimed is:

1. A drive arrangement for a wind turbine, comprising:
a sun shaft, which is non-rotatably connected or connectable to a sun gear arranged on a rotor side with respect to the sun shaft;
a shaft or hub for receiving a rotor of a generator;
a connecting element, which is connected non-rotatably to the sun shaft and the shaft or hub and which is arranged inside the shaft or hub or on a generator side relative to the shaft or hub; and
one or more spring and/or damping elements that decouple the connecting element from the sun shaft and/or the shaft or hub,
wherein the one or more spring and/or damping elements each have a cylindrical outer bushing with which each respective spring and/or damping element is inserted into the respective receptacle of the connecting element, or wherein the one or more spring and/or damping elements each have a cylindrical inner bushing that is screwed to the sun shaft or the shaft or hub.

2. The drive arrangement according to claim 1, wherein:
the one or more spring and/or damping elements decouple the connecting element from the shaft or hub, and
the sun shaft and the connecting element are rigidly connected to each other.

3. The drive arrangement according to claim 1, wherein the one or more spring and/or damping elements are each inserted in a respective receptacle of the connecting element.

4. The drive arrangement according to claim 3, wherein:
the one or more spring and/or damping elements each comprise at least one washer with a through hole, and
the at least one washer protrudes at least partially beyond the receptacle of the connecting element and is fixed in the sun shaft or the shaft or hub.

5. The drive arrangement according to claim 1, wherein the one or more spring and/or damping elements are each screwed to the sun shaft or the shaft or hub.

6. The drive arrangement according to claim 1, wherein the one or more spring and/or damping elements each comprise an elastomer.

7. The drive arrangement according to claim 1, wherein the connecting element comprises an inner flange connected to the sun shaft, an outer flange connected to the shaft or hub, and a plurality of spokes interconnecting the inner flange and the outer flange.

8. A drive arrangement for a wind turbine, comprising:
a sun shaft, which is non-rotatably connected or connectable to a sun gear arranged on a rotor side with respect to the sun shaft;
a shaft or hub for receiving a rotor of a generator;
a connecting element, which is connected non-rotatably to the sun shaft and the shaft or hub and which is arranged inside the shaft or hub or on a generator side relative to the shaft or hub; and
spring and/or damping elements that decouple the connecting element from the sun shaft and the shaft or hub,
wherein the spring and/or damping elements that decouple the connecting element from the sun shaft are aligned along a radial direction with the spring and/or damping elements that decouple the connecting element from the shaft or hub, the radial direction extending radially from a central axis of the connecting element, and
wherein the spring and/or damping elements are arranged at a single axial position relative to the central axis of the connecting element.

9. The drive arrangement according to claim 8, wherein the connecting element comprises an inner flange connected to the sun shaft, an outer flange connected to the shaft or hub, and a plurality of spokes interconnecting the inner flange and the outer flange, and
wherein the spokes each extend in the radial direction from one of the spring and/or damping elements to another of the spring and/or damping elements.

* * * * *